US011111188B2

(12) United States Patent
Shuttleworth

(10) Patent No.: US 11,111,188 B2
(45) Date of Patent: Sep. 7, 2021

(54) CONTAINER-BASED COMPOSTING

(71) Applicant: Timothy G. Shuttleworth, Fairview, PA (US)

(72) Inventor: Timothy G. Shuttleworth, Fairview, PA (US)

(73) Assignee: Timothy G. Shuttleworth, Erie, PA (US)

(*) Notice: Subject to any disclaimer, the term of this patent is extended or adjusted under 35 U.S.C. 154(b) by 239 days.

(21) Appl. No.: 16/168,163

(22) Filed: Oct. 23, 2018

(65) Prior Publication Data
US 2019/0119180 A1 Apr. 25, 2019

Related U.S. Application Data

(60) Provisional application No. 62/575,640, filed on Oct. 23, 2017.

(51) Int. Cl.
C05F 17/979 (2020.01)
C05F 17/914 (2020.01)

(52) U.S. Cl.
CPC .......... C05F 17/979 (2020.01); C05F 17/914 (2020.01)

(58) Field of Classification Search
CPC .. C05F 17/979; C05F 17/914; C05F 17/0205; C05F 17/0258; C05F 17/027; C05F 17/02; C05F 17/0063; C05F 17/0247; C05F 17/0229; B09B 3/00
USPC ...................................... 435/290.1
See application file for complete search history.

(56) References Cited

U.S. PATENT DOCUMENTS 4,203,755 A * 5/1980 Ruckstuhl ............... C05F 17/95
71/9
4,339,265 A 7/1982 Engelmann
4,483,704 A 11/1984 Easter, II
(Continued)

FOREIGN PATENT DOCUMENTS

JP 2012144430 A * 8/2012 ............ C05F 17/964

OTHER PUBLICATIONS

Fuchs, John, (Mar. 30, 2012), Reducing Flow vs. Reducing Pressure—Which Is it? (Year: 2012).*
(Continued)

Primary Examiner — Michael L Hobbs
Assistant Examiner — Lenora A Abel
(74) Attorney, Agent, or Firm — K&L Gates LLP

(57) ABSTRACT

Composting systems and methods are disclosed. A composting kit can be removably installed in roll-off waste containers and/or open-topped shipping containers without modifying the container. The composting kit can include a perforated aeration conduit, a flow regulator positioned along the perforated aeration conduit, and a delivery conduit fluidically coupled to the perforated aeration conduit at a releasable joint comprising a clearance fit. Additionally, the composting kit can include a blower configured to be fluidically coupled to the delivery conduit. The composting kit can be assembled into a working configuration in which the perforated aeration conduit is positioned within the container and the delivery conduit is fluidically coupled to the blower and to the perforated aeration conduit. The components of the composting kit can be removed from the container before the compost is unloaded from the container.

20 Claims, 8 Drawing Sheets

(56) References Cited

U.S. PATENT DOCUMENTS

| | | | | |
|---|---|---|---|---|
| 4,521,517 A | * | 6/1985 | Gauthier | C05F 17/979 |
| | | | | 435/290.1 |
| 4,798,801 A | * | 1/1989 | Hitzman | C12M 21/04 |
| | | | | 435/290.1 |
| 4,798,802 A | | 1/1989 | Ryan | |
| 5,190,572 A | | 3/1993 | Long | |
| 5,312,754 A | | 5/1994 | Bryan-Brown | |
| 5,354,349 A | | 10/1994 | Inoue | |
| 5,407,809 A | | 4/1995 | Finn | |
| 5,409,831 A | | 4/1995 | Wright | |
| 5,417,736 A | | 5/1995 | Meyer | |
| 5,593,272 A | * | 1/1997 | Green | B60P 1/04 |
| | | | | 296/164 |
| 5,597,732 A | * | 1/1997 | Bryan-Brown | C05F 17/914 |
| | | | | 435/290.4 |
| 6,281,001 B1 | * | 8/2001 | McNelly | C05F 17/964 |
| | | | | 435/262 |
| 6,382,585 B1 | * | 5/2002 | Pubben | F16K 7/17 |
| | | | | 137/630.15 |
| 6,383,369 B2 | * | 5/2002 | Elston | C02F 9/00 |
| | | | | 210/104 |
| 7,833,781 B2 | * | 11/2010 | Thurot | C05F 17/964 |
| | | | | 435/290.1 |
| 9,044,795 B2 | * | 6/2015 | Tyler | A01G 9/02 |
| 2012/0021504 A1 | * | 1/2012 | Bradlee | C05F 17/986 |
| | | | | 435/290.4 |

OTHER PUBLICATIONS

Machine Description Translation of JP2012144430A (Year: 2012).*
The Process Piping Document (Year: 2017).*

* cited by examiner

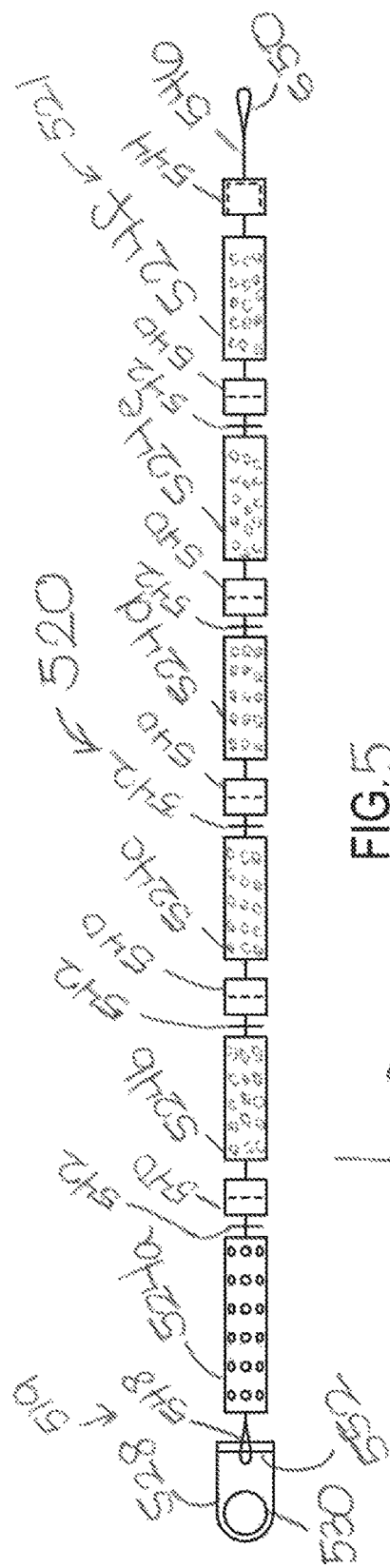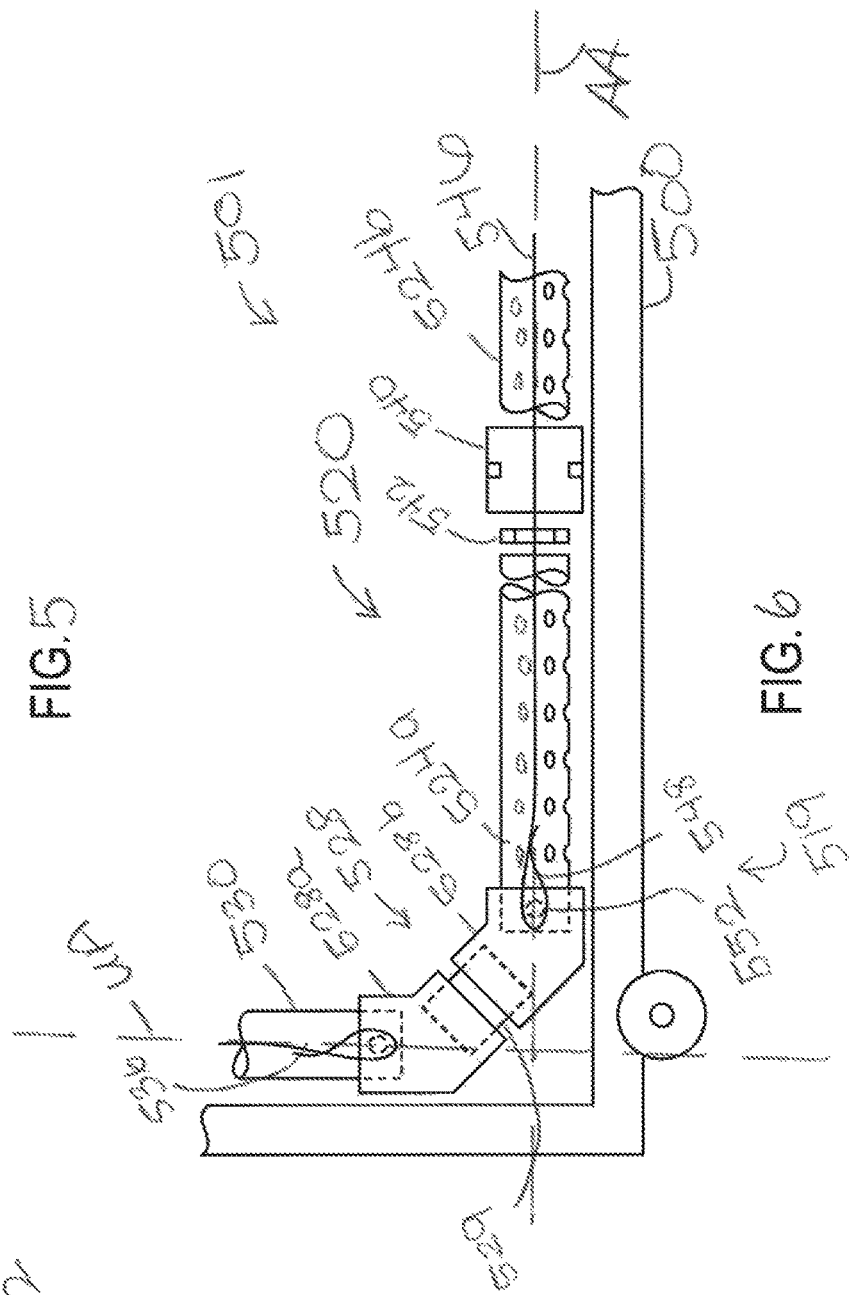

CONTAINER-BASED COMPOSTING

CROSS-REFERENCE TO RELATED APPLICATION

This application claims the benefit of priority under 35 U.S.C. 119(e) to U.S. Provisional Patent Application Ser. No. 62/575,640, titled COMPOSTING SYSTEMS AND METHODS, filed Oct. 23, 2017, the entire disclosure of which is incorporated by reference herein.

BACKGROUND

Composting systems and methods can be employed in various environments and in operations of varying scale. For example, individuals can compost material in their homes and large entities can compost material at commercial composting sites. Farms often have large volumes of raw, compostable material, such as manure, which can amass in exposed piles. Such piles can be unsightly, foul smelling, attractive to pests, and/or problematic to nearby environments and ecosystems. Additionally, run-off or leaching from these exposed piles may flow into nearby bodies of waters, which may contaminate a water source and/or violate one or more environmental regulations. Despite the negative consequences from storing raw, non-composted material, composting the material may not be cost-effective because composting equipment and services can be expensive, time-consuming, labor-intensive, and/or impractical in certain instances. Additionally, compost can be a relative cheap commodity.

SUMMARY

A composting kit can comprise a perforated aeration conduit defining a first axis, wherein the perforated aeration conduit comprises a first end, a second end, and a central opening along the first axis between the first end and the second end. The composting kit can further comprise a delivery conduit defining a second axis, wherein the delivery conduit is configured to be fluidically coupled to the first end of the perforated aeration conduit at a releasable joint comprising a clearance fit. The composting kit can also comprise a blower configured to be fluidically coupled to the delivery conduit. The composting kit can be configured to be assembled into a working configuration in which the perforated aeration conduit is positioned within a container and the delivery conduit is fluidically coupled to the blower and to the perforated aeration conduit, wherein the second axis traverses the first axis when the composting kit is in the working configuration, and wherein the blower is configured to provide air to the perforated aeration conduit when the composting kit is in the working configuration.

A composting system can comprise an open-top roll-off container comprising a doorway and a perforated aeration conduit positioned within the open-top roll-off container, wherein the perforated aeration conduit defines a first axis extending through the doorway, and wherein the perforated aeration conduit comprises a first end, a second end, and a central opening along the first axis between the first end and the second end. The composting system can also comprise a delivery conduit defining a second axis traversing the first axis, wherein the delivery conduit is fluidically coupled to the first end of the perforated aeration conduit at a releasable elbow joint. The composting system can further comprise a blower positioned outside the open-top roll-off container and fluidically coupled to the delivery conduit, wherein the blower is configured to provide pressurized air to the perforated aeration conduit.

A composting method can comprise positioning an aeration distributor within an open-top roll-off container, fluidically coupling a delivery conduit to the aeration distributor, fluidically coupling a blower to the delivery conduit, loading raw material into the open-top roll-off container, providing air to the aeration distributor from the blower during a composting cycle in which the raw material becomes compost, and unloading the compost from the open-top roll-off container.

FIGURES

Various features of the embodiments described herein, together with advantages thereof, may be understood in accordance with the following description taken in conjunction with the accompanying drawings as follows:

FIG. 5 is an exploded top view an aeration distributor, according to various aspects of the present disclosure.

FIG. 6 is a partially-exploded side view of a portion of the aeration distributor of FIG. 5 positioned in a roll-off container, in which several hidden internal components are shown for illustrative purposes, according to various aspects of the present disclosure.

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Figure 1:
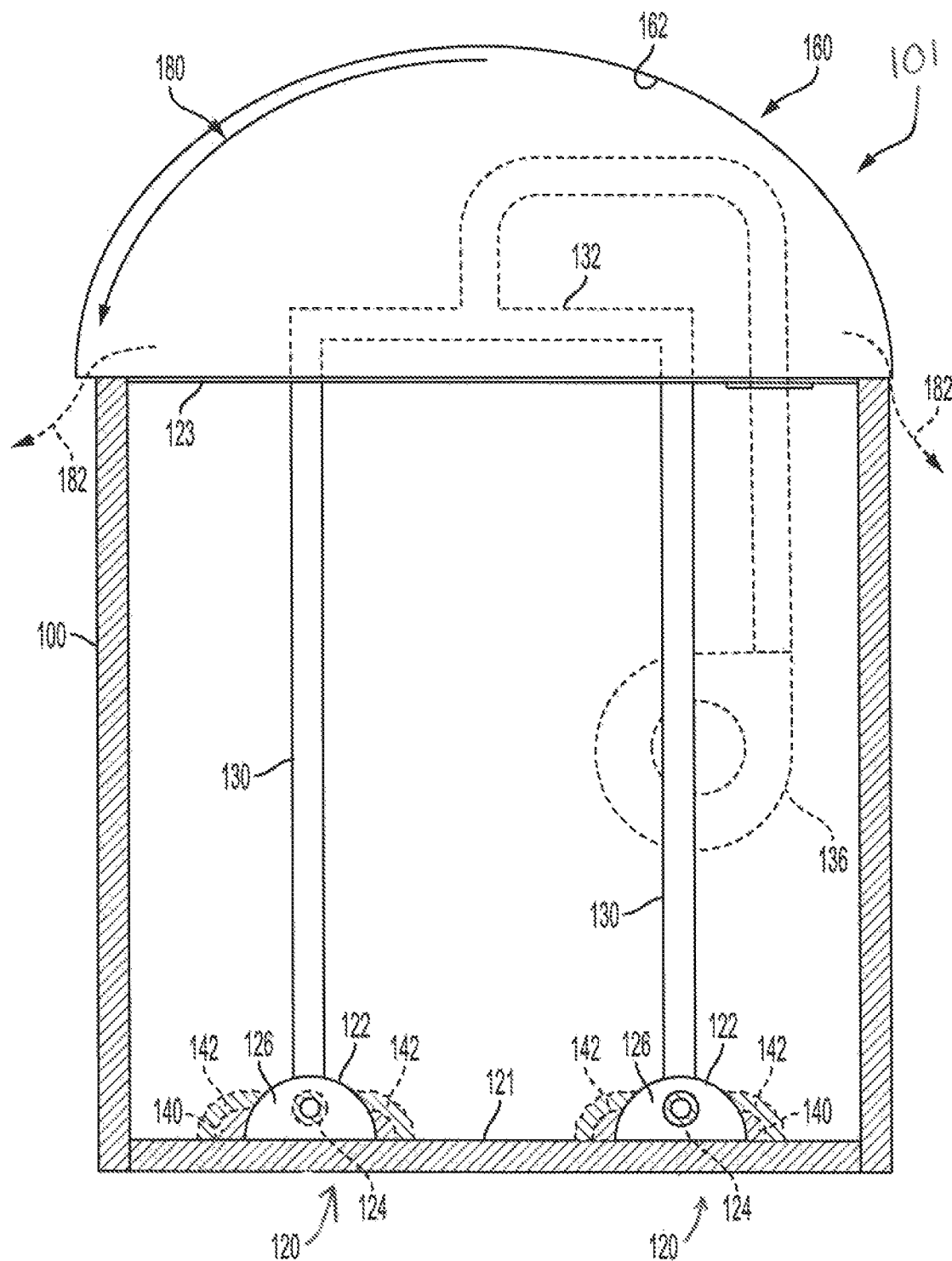
FIG. 1 is a cross-sectional end view of a composting system, according to various aspects of the present disclosure.

Composting is a natural process whereby oxygen and water permit natural organisms to decay organic material. This decayed organic material has many desirable attributes compared to the pre-composted raw material. However, various composting methods can require frequent injections of effort by an operator on a daily basis or even more frequently. For example, in a "turned pile" composting method, a pile of raw organic material is periodically "turned" to introduce oxygen and break-up the material. In smaller batches, the pile can be turned by a farmer with a pitchfork. In larger batches, a tractor with a front-end bucket can turn the pile. Commercial operations can utilize one or more purpose-built windrow turning machines. Such turned pile methods can be labor-intensive and slow often requiring many weeks or even months to complete the composting cycle.

To accelerate the composting cycle, blowers, controls, and air distribution systems can be utilized to inject oxygen into the organic matter. This can be referred to as an Aerated Static Pile (ASP) method. In certain instances, doses of oxygen can be provided based on a process metric, such as the temperature of the pile. ASP methods may complete a composting cycle in four to five weeks or even as little as two to three weeks, followed by a curing period. Either way, the ASP method can be completed in a fraction of the time (or even an order of magnitude faster) in comparison to the turned pile method. Many rapid processes also involve using smaller, more homogenized pieces of raw material, controlling the carbon-to-nitrogen ratio (e.g. to 30-to-1 or less), and/or careful monitoring of the moisture level and temperature(s) of the process.

The bacterial activity in rapid composting methods, such as an ASP method, can generate high temperatures of approximately 130-140° F., for example, which can break down the material, and/or destroy pathogens and/or seeds. The raw material/original feedstock can be unrecognizable after the composting process is complete. At this stage, the compost can be used to prepare fields or other planting areas; however, many professionals recommend that the compost be given time to cure before using in a nursery for starting seeds or growing young plants. The curing time allows fungi to continue the decomposition process and eliminates phytotoxic substances.

Certain ASP methods can require significant capital cost, especially the facility expense. Alternatively, when ASP is deployed on open ground, the process control can suffer and/or unmitigated environmental issues can arise. It is desirable to compost material economically, without requiring frequent efforts by an operator and/or while safe guarding the environment.

In one general aspect, various types of material can be composted using pressurized air. For example, the ASP method can be employed. Material that is added to a composting system and/or treated during a composting cycle can be referred to as "raw material." Raw material can include organic solid waste (i.e., green waste), human waste, and animal manure and bedding, such as straw, sawdust, paper and cardboard, for example. Upon completion of the composting cycle, the material that is removed from the composting apparatus can be referred to as "compost." In certain instances, the compost can be subjected to a lower temperature curing step before the compost is finished or seasoned for use.

For example, in one aspect, a composting kit can be provided for use with a multi-purpose container, such as an open-top roll-off container, for example. The composting kit can include a perforated aeration conduit defining a first axis, wherein the perforated aeration conduit comprises a first end, a second end, and a central opening along the first axis between the first end and the second end. The composting kit can further include a delivery conduit defining a second axis, wherein the delivery conduit is configured to be fluidically coupled to the first end of the perforated aeration conduit at a releasable joint comprising a clearance fit. Additionally, the composting kit can include a blower configured to be fluidically coupled to the delivery conduit. The composting kit can be assembled into a working configuration in which the perforated aeration conduit is positioned within a container and the delivery conduit is fluidically coupled to the blower and to the perforated aeration conduit, wherein the second axis traverses the first axis when the composting kit is in the working configuration, and wherein the blower is configured to provide pressurized air to the perforated aeration conduit when the composting kit is in the working configuration. The composting kit may also include a flow regulator positioned along the perforated aeration conduit between the first end and the second end. The composting kit can be utilized for a composting method that includes positioning the perforated aeration distributor within the open-top roll-off container, fluidically coupling the delivery conduit along a bottom, horizontal surface of the perforated aeration conduit, fluidically coupling the blower to the delivery conduit, loading raw material into the open-top roll-off container, providing air to the perforated aeration distributor from the blower during a composting cycle in which the raw material becomes compost, and unloading the compost from the open-top roll-off container. Additional examples are further described herein.

In various instances, raw material can be composted in a standard container, such as a common, commercially-available roll-off waste container, dumpster, or open-top intermodal shipping container. The container can be a substantially rectangular container having walls, a floor, at least one operative door, and an open top. The open top can be covered with a reusable, removable, breathable cover, as further described herein. The cover can protect the container from natural elements like rain and snow while still permitting the discharge of excessive moisture, for example. Roll-off waste containers, or similar containers, are used extensively in the waste management industry and intermodal containers are used extensively in the transportation industry and, thus, can often be obtained at a relatively low-cost. Moreover, as further described herein, such containers can be utilized for composting without permanent modifications thereto, which can be economically advantageous. The reader will readily appreciate that various alternative containers, including different commercially available containers, can also be suitable.

Figure 9:
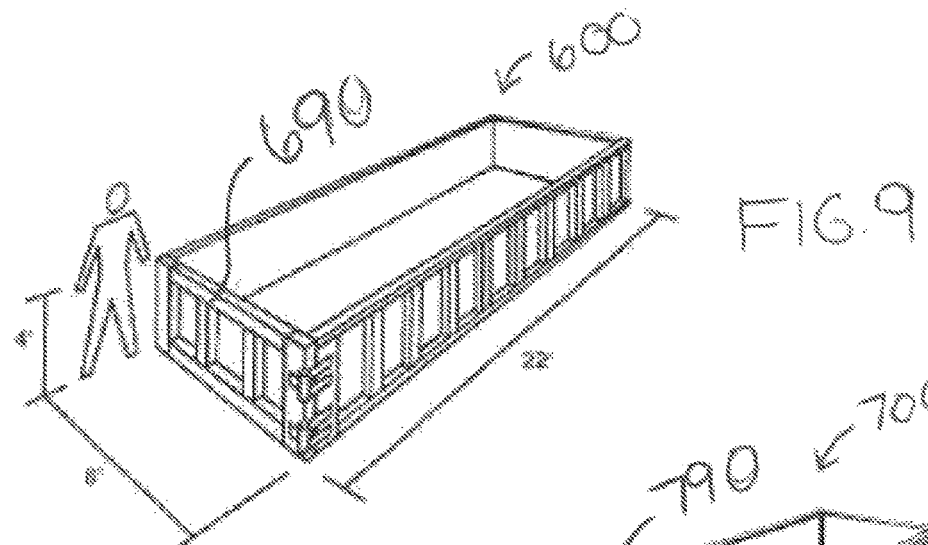
FIG. 9 is a perspective view of a 20-yard open-top roll-off container, according to various aspects of the present disclosure.
Figure 10:
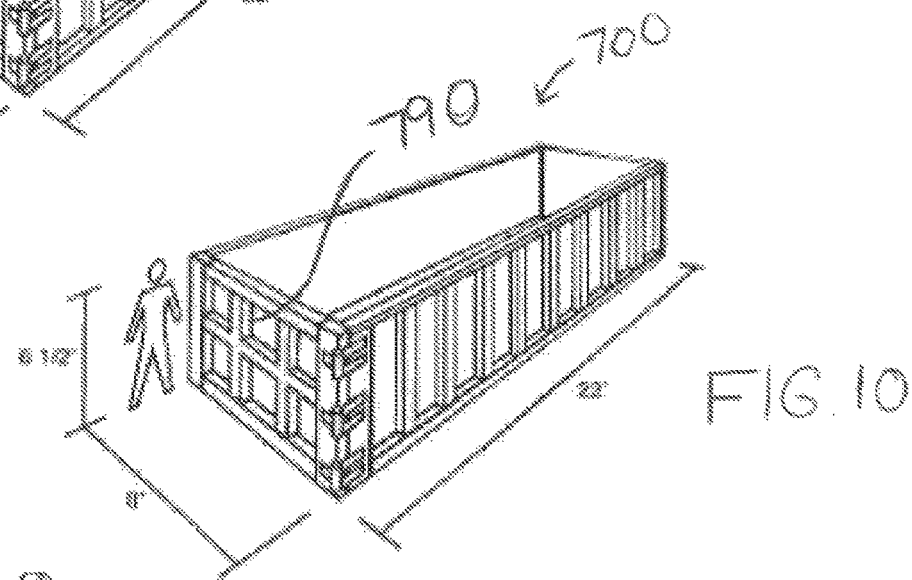
FIG. 10 is a perspective view of a 30-yard open-top roll-off container, according to various aspects of the present disclosure.
Figure 11:
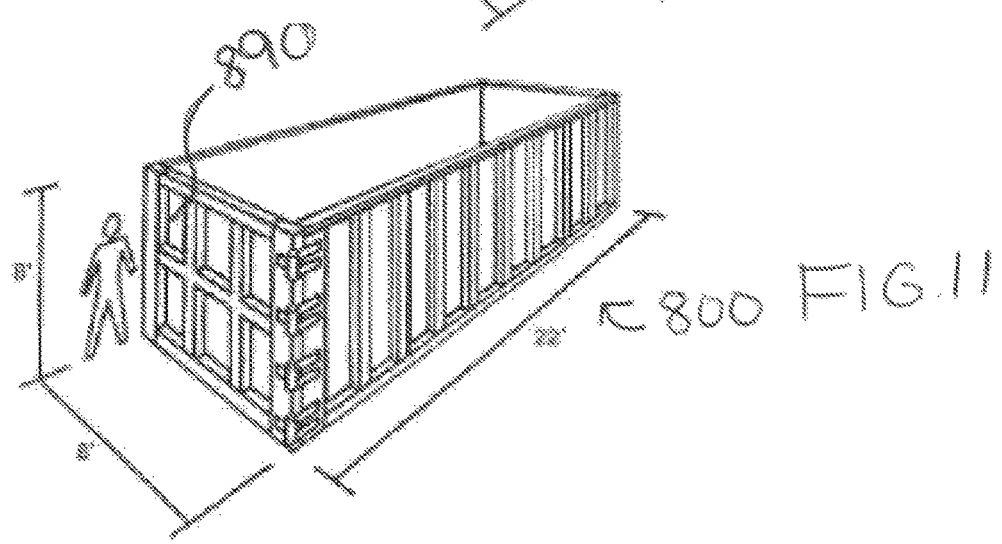
FIG. 11 is a perspective view of a 40-yard open-top roll-off container, according to various aspects of the present disclosure.

Exemplary open-top roll-off containers are shown in FIGS. 9-11. For example, FIG. 9 depicts a 20 cubic-yard container 600, FIG. 10 depicts a 30 cubic-yard container 700, and FIG. 11 depicts a 40-cubic yard container 800. The containers 600, 700, and 800 can be utilized in the various composting systems and methods disclosed herein. Each container 600, 700, and 800 includes a floor, four sides, and an open top. A door 690, 790, 890 is positioned on one of the four sides for each container 600, 700, and 800, respectively. The doors 690, 790, and 890 form one entire side of each container 600, 700, and 800, respectively. In other instances, the doors 690, 790, and/or 890 can form a portion of a side wall. The doors 690, 790, and 890 open along lateral hinges; however, other door opening arrangements (e.g. sliding, folding, etc.) are envisioned. As illustrated, the containers 600, 700, and 800 are 22 feet long and 8 feet wide. The height of each container is different, which accounts for the variations in volume. Owing to the standard footprint and geometry of the containers 600, 700, and 800, they are configured to be loaded onto a truck for transportation. The reader will readily appreciate that alternative container geometries can also be utilized. For example, dumpsters and intermodal shipping containers can define standard sizes, which can accommodate various composting systems disclosed herein.

In certain instances, aeration of raw material that is loaded into a container can be provided by a ductwork system including conduits, pipes, tubes, or ducts that enter the container through the open-top and are arranged along a solid floor of the container. The ductwork system can be installed and maintained in position without modifying the container. For example, the solid walls and the floor, or bottom surface, of the containers 600, 700, and 800 (FIGS. 9-11) can remain unchanged, e.g., free of additional screw holes, slits, or other openings. In certain instances, the container can be rented or leased. In such instances, modifying the container may be prohibited by the lessor. Additionally, a modified container can be difficult to return to a conventional waste management or transportation application because any modifications thereto must be undone and may undermine the integrity of the container. However, unmodified containers can be returned to conventional non-composting uses after being used in a composting system for days, weeks, months or even years and, thus, retain their asset value as waste management containers (e.g. dumpsters) and/or shipping containers, for example. Similarly, when other standard-size containers are utilized in the composting system described herein, the containers can be returned to their pre-composting use such as for collecting refuse, shipping and/or storing goods, for example.

In various instances, an aeration system of a composting system can be removed from the container while the container is loaded with compost. As a result, the loaded container can be transported as conventional roll-off waste containers, such as by a roll-off truck, to relocate the compost to a suitable buyer and/or end-user, for example. Moreover, the removed aeration system can be installed in another container to begin a subsequent composting cycle. In such instances, the container can easily alternate or transition between a composting function and a non-composting function, such as storage and/or transportation, for example. Additionally, at least a portion of a composting cycle can occur during a storage and/or transportation step, as well.

Figure 2:
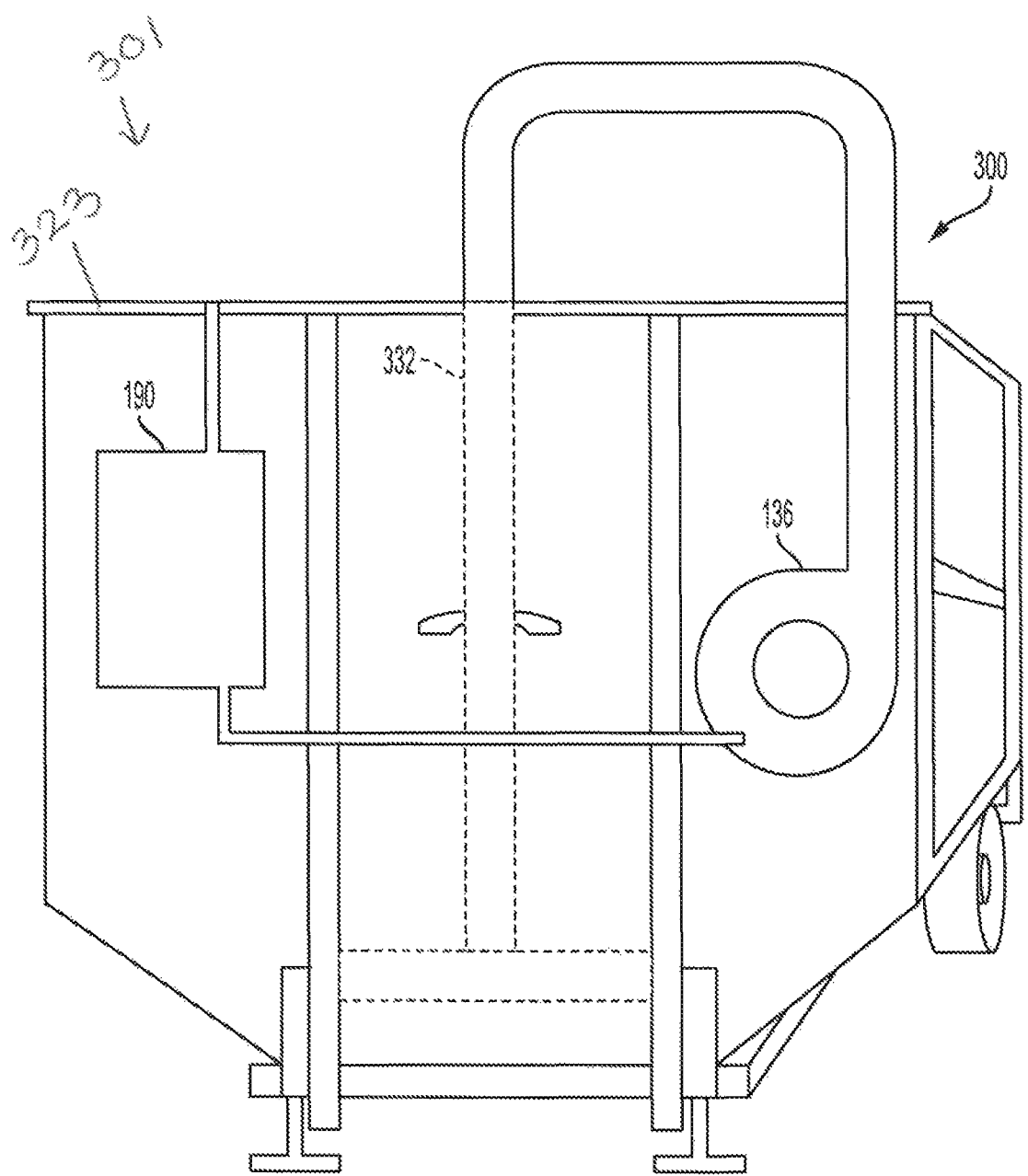
FIG. 2 is an end view of a composting system, wherein certain internal components are depicted with phantom lines for illustrative purposes, according to various aspects of the present disclosure.
Figure 7:
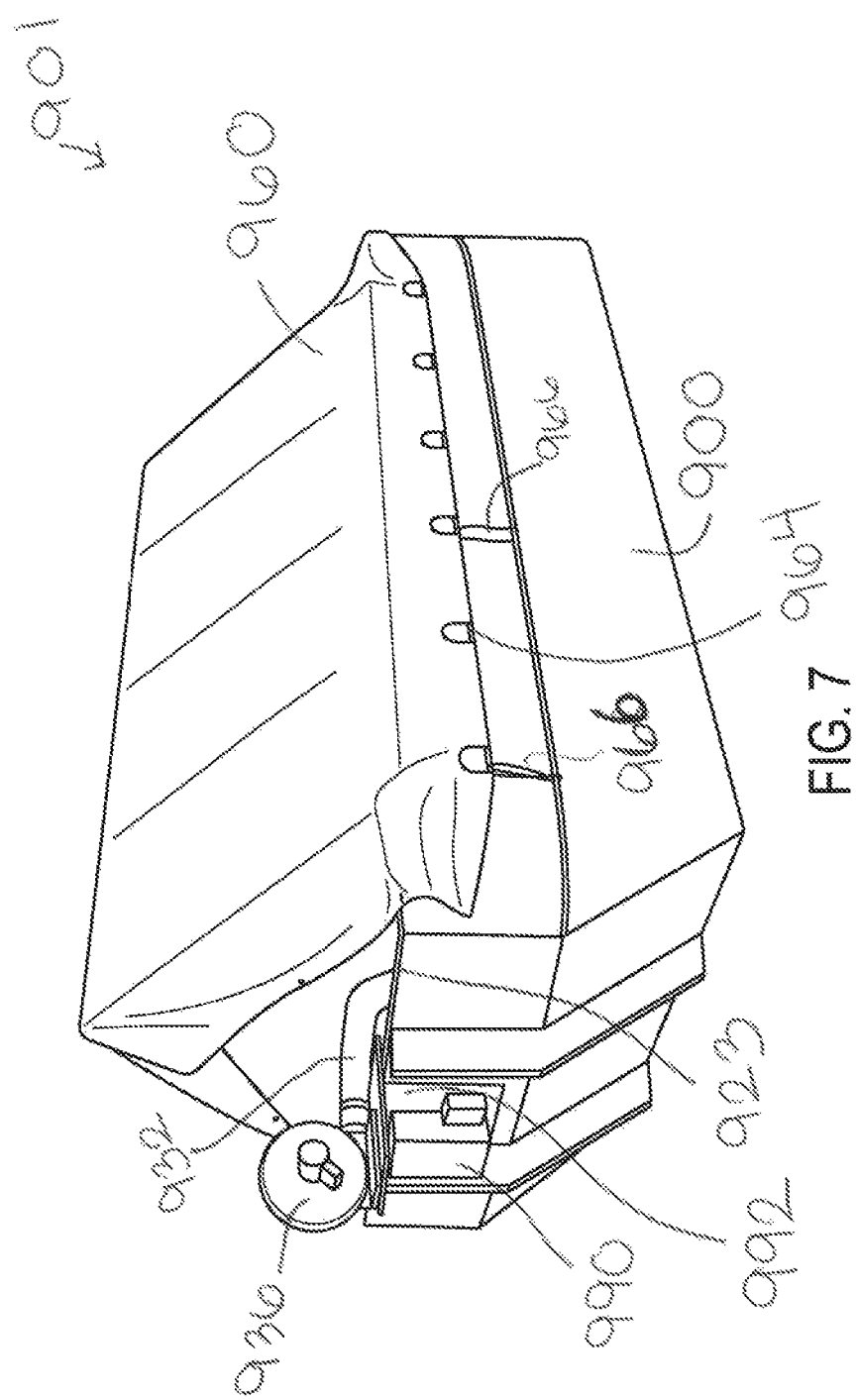
FIG. 7 is a perspective view of a composting system, according to various aspects of the present disclosure.

A schematic of an exemplary composting system 101 according to various embodiments of the present invention is depicted in FIG. 1. The composting system 101 includes a container 100, which may be a standard, roll-off waste container. The container 100 can be a 10 yard, 15 yard, 20 yard, 30 yard or 40 yard dumpster, for example. In other instances, the container 100 can be an open-top intermodal shipping container. For example, the shipping container can be an 80 yard container. The reader will appreciate that various alternative open-top containers and/or sizes thereof can be used. Such containers are readily available and compatible with existing transportation systems such as roll-off trucks, trains, and/or forklifts, for example. The container 100 can be similar to the containers 600, 700, and 800 (FIGS. 9-11), for example. Exemplary containers are also depicted in FIGS. 2, 6, and 7, for example.

The container 100 is open on the top and includes an operative door at one end. Aeration distributors 120 are installed in the container 100 without modifying the container 100. In certain instances, the aeration distributors 120 and/or portions thereof can be pre-assembled and then placed along a bottom surface 121 of the container 100. The aeration distributors 120 are tube-in-tunnel distributors. In other words, the aeration distributors 120 include an inner tube 124 positioned between a barrier tube 122 and the bottom surface 121 of the container 100. The barrier tube 122 and the container 100 can form a plenum or chamber in which the inner tube 124 resides. In other instances, the aeration distributors 120 may not include the barrier tube 122. Alternative aeration distributors are described herein.

As depicted in FIG. 1, a pair of aeration distributors 120 extend in parallel along the bottom surface 121 of the container 100 into/out off the page as shown in FIG. 1. In other instances, more than two aeration distributors 120 can be positioned along the bottom surface 121 of the container 100. In still other instances, a single aeration distributor 120 can be positioned along the bottom surface 121 of the container 100. The aeration distributors 120 can be manufactured from commercially-available materials, as described under the heading "Example Aeration Distributor" herein. Moreover, the aeration distributors 120 can be durable and, thus, can be reusable for multiple composting cycles.

Each aeration distributor 120 includes the inner tube 124 (also extending into/out of the page for FIG. 1), which is a perforated conduit. Perforations or holes in the inner tube 124 are spaced along the length thereof. The inner tube 124 can be held within the barrier tube 122 by semi-circular buttresses 126 at one of more locations along the length of the inner tube 124. For example, buttresses 126 can be positioned on opposing ends of the inner tube 124. A first end of the inner tube 124 is coupled to an elbow fitting and the opposite end of the inner tube 124 is capped with an end cap.

The aeration distributors 120 are coupled to delivery pipes 130, or upright pipes, that exit the container 100 along the top edge 123 on one of the four sides. The upright pipes 130 are connected to the elbow fittings and extend upward toward a manifold 132. The manifold 132 is connected to a blower 136. The manifold 132 can consist of standard ductwork components, for example. Referring still to FIG. 1, the blower 136 is mounted on the end of the container 100 opposite the operative door. For example, the blower 136 can be suspended by a hook extending over the top edge 123 of the container 100, and the hook can be held in place by gravity. The reader will readily appreciate that the blower 136 can be mounted on any suitable side of the container 100 and the manifold 132 can be modified and/or moved to fluidically couple the upright pipes 130 to the blower 136. For example, in FIG. 1, the manifold 132 includes a horizontal pipe extending between the two upright pipes 130 above the top edge 123 of the container 100. The manifold 132 can be removed without unloading the loaded material (e.g. raw organic material and/or compost). The manifold 132 includes a tee having a pair of outlets. In such instances, the manifold 132 can bifurcate the air supplied by the blower 136. In other instances, a manifold can direct the air toward one or more additional aeration conduits.

The blower 136 can be a 1.5 HP, 1200 Watt blower, for example. It may have a discharge velocity to atmosphere (no resistance) of approximately 5000 feet/minute from the center of a 4-inch diameter outlet, which can correspond to between 400 and 500 cubic-feet/minute to atmosphere. At static pressure (100% resistance), it can develop approximately 7.5 inches of pressure in a water column, which is about 0.27 pounds/square-inch. In other instances, a 2.0 HP or larger blower can be utilized. For example, a 1.5 HP, 1200 Watt blower is suitable for a 10-yard container; however, a more powerful blower can be utilized with a larger container (e.g. a 20-yard container) and/or when utilized with more than one container/composting system. For example, a single blower can be coupled to multiple composting systems. Alternatively, a 1.5 HP, 1200 Watt blower can be utilized for a larger load; however, the duty cycle may increase and/or the composting cycle may require more time. In other instances, the blower for a composting kit can include a compressor or a fan, for example. A power cord can supply power to the blower 136. For example, an outdoor extension cord can extend between a 15-amp or 20-amp circuit and the blower 136.

In FIG. 2, an alternative composting system 301 is depicted. The composting system 301 can be similar in many respects to the composting system 101 (FIG. 1). For example, the composting system can include a pair of aeration conduits extending parallel to the longitudinal axis of a container 300. The container 300 can be similar to the containers 600, 700, and 800 (FIGS. 9-11), for example. Exemplary containers are also depicted in FIGS. 1, 6, and 7, for example. The aeration conduits can be fluidically coupled to the blower 136 by a manifold 332. The horizontal pipe of the manifold 332 extending between the aeration conduits is positioned below a top edge 323 of the container 300. In such instances, the horizontal pipe may be covered with raw material and/or compost and removing at least a portion of the loaded material may be necessary before the manifold 332 can be removed from the container 300.

Referring again to FIG. 1, a delivery conduit, or upright pipe, 130 extends vertically or substantially vertically from the respective elbow fitting. The elbow fitting can be two 45-degree elbows to form a 90-degree turn, for example, and the upright pipe 130 can securely fit or nest with the elbow fitting. The elbow fitting can include a non-interference fit, or clearance fit, which can permit quick release and/or separation of the components when an upward force is applied to the upright pipe 130. In certain instances, the 45-degree to 45-degree fitting can be press-fit or friction-fit, for example, and/or may be taped to permit the upright pipe 130 to disengage the elbow fitting and be lifted out of the container 100 with ease and without substantially emptying the loaded contents in the container 100. In other instances, the elbow fitting can be a 90-degree elbow conduit. The upright pipe 130 can be removed from the container 100 even when the elbow fitting is inaccessible, e.g., buried under raw material and/or compost within the container 100. As further described herein, after the upright pipe 130 has been withdrawn along an upright axis, the aeration distributor 120 can be pulled horizontally through an opened door of the container 100 thereby withdrawing the aeration distributor 120 without removing the compost in the container 100.

The aeration distributors 120 can be held in place within the container 100 by gravity alone. In other words, the unmodified container 100 can hold the aeration distributors 120 in place. After the aeration distributors 120 are laid into the unmodified empty container 100, wood chips 140 and/or wood shavings 142 can be added to the container 100. For example, wood chips 140 can form a first layer on the bottom surface of the container 100, and wood shaving 142 can form a second layer on the wood chips 140. The container 100 can then be ready to receive the raw material. In addition to raw material, moisture can be added to ensure the container 100 includes an ideal feed composition.

The raw material can be mounded slightly and still fit under a removable cover or roof 160. The cover 160 provides a breathable cover for enclosing the entire container 100. The cover 160 can be comprised of a water-proof tarp and frame members. For example, longitudinal frame members can extend along opposing lengths of the tarp and flexible pipes or supports can extend across the tarp between the opposing longitudinal frame members. The flexible pipes can bend to form an arc between the opposing longitudinal frame members. In certain instances, the edges of the tarp can include grommet holes adjacent to the longitudinal frame members. Elastic cords can engage the grommet holes to pull the edges of the tarp toward the ground on opposite sides and/or ends of the container 100. Alternative covers are further described herein. Such covers can be removably secured to the to containers without modifying the container.

Referring still to FIG. 1, the cover 160 includes an inside surface 162, which can correspond to the underside of the tarp. The inside surface 162 can define an arced profile, for example. During a composting cycle, water droplets or condensation 180 can form on the inside surface 162. The surface tension of the condensation 180 and the profile of the inside surface 162 can direct the condensation 180 to "roll" toward the edges of the cover 160. Referring still to FIG. 1, the edges of the cover 160 are configured to overhang the perimeter of the container 100 such that the condensation 180 is discharged beyond the perimeter of the container 100. In other words, the breathable cover 160 can provide an escape path 182 for air and water. Another cover 960 is depicted in FIG. 7 and, in various instances, the cover 960 can be incorporated into the composting system 101 (FIG. 1) and, in certain instances, the cover 160 (FIG. 1) can be incorporated into the composting system 901 (FIG. 7).

The blower 136 can be periodically-activated to circulate a gas, such as air, through the aeration distributors 120 to maintain an aerobic condition within the container 100. In particular, the blower 136 can direct air into the manifold 132, through the upright pipes 130, and into the inner pipes 124 of the aeration distributors 120. In various instances, the blower 136 can be activated by a timer for a few seconds each half-hour or each hour, for example. For example, the duty cycle for the blower can be 1%-10%. In certain instances, the temperature of the compost within the container 100 can be monitored by one or more temperature sensor(s) placed at various locations within the container 100 to ensure an appropriate temperature is maintained. Activation of the blower 136 can be a function of the detected temperature.

Composting of raw material can require a few weeks of time and, during that time, no additional labor or work may be required of the operator. In certain instances, the composting system 101 can include a control panel (such as the control panel 190 in FIG. 2 and the control panel 990 in FIG. 7), which can be configured to communicate information to an operator and/or receive inputs from an operator via a user interface, such as a touchpad control screen. Such a control panel can be releasably attached to the container 100, as further described herein.

Referring primarily now to FIG. 2, the control panel 190 for the composting system 301 can be suspended by a hook extending over the top edge 323 of the container 300, and the hook can be held in place by gravity, for example. The control panel 190 can allow the operator to initiate and/or terminate a composting cycle, manually operate the blower 136, and/or input information such as the type and/or fullness level of the container 300. For example, the control panel 190 can be communicatively coupled to the blower 136. In one aspect, when the container 300 has been loaded with raw material, the user can provide inputs to the control panel 190 to initiate the composting cycle. In certain instances, the duration of the composting cycle and the duration and frequency of the blower's activation period can be a function of the information input into the control panel 190. The control panel 190 can further permit the user to modify the composting cycle and/or further activate the blower 136.

Additionally, or alternatively, the control panel 190 can display the temperature(s) detected within the container 300, the outside temperature, the length of the composting cycle, and/or the estimated completion time. In various instances, the control panel 190 can include a processor-based control unit, such as a microcontroller or microprocessor, which can be in signal communication with a remote computing device (i.e., remote from the container 300). The control unit can be in communication with the remote computing device via a communication network (e.g., the Internet, a LAN, Ethernet, etc.) using wired or wireless (e.g., WFi) communication links. In such instances, the control unit can convey information to and/or from the remote computing device. An operator at the remote computing device may be able to monitor and/or effect changes to the composting cycle via inputs to the remote computing device and/or may receive alerts and/or updates regarding the composting cycle from the control unit. For example, an operator can interact with the composting system via an application on a smart phone.

Referring again to FIG. 1, when the composting cycle is complete, the composting system 101 can be disassembled. For example, the blower 136 can be disconnected from the manifold 132 and/or the manifold 132 can be disconnected from the upright pipes 130. When disconnected, the blower 136, even when activated, cannot provide air to the aeration distributors 120. The upright pipes 130 exiting the compost at the top of the container 100 can be pulled free of the connection at the elbow fitting. For example, the upright pipes 130 can be extracted along vertical or upright axes extending through the upright pipes 130. Moreover, in various instances, the pre-assembled tube-in-tunnel aeration distributor 120 can be removed without unloading the finished compost. For example, the door to the container 100 can be opened, which can reveal one end of each tube-in-tunnel aeration distributor 120. For example, the central opening of each inner tube 124 can define a longitudinal axis that is aligned with the doorway of the container such that the aeration distributors 120 can be withdrawn through the doorway along the respective longitudinal axes. For example, the longitudinal axis can extend through the open doorway, and when the door is closed, the longitudinal axis can be oriented perpendicular to the inside surface of the door. The exposed proximal end of the aeration distributor 120 can be connected to a tractor or other suitable equipment by a chain, cable, or strap and pulled lengthwise free from the bulk volume above. The entire aeration distributor 120, including the barrier tube 122, inner tube 124 and buttress 126 can be removed from the container 100. After the aeration distributors 120 have been removed, the container door can be closed.

Incidental compost may be discharged during extraction of the aeration distributors 120. The discharged compost can be replaced on top of the volume of compost within the container 100. After the cover 160 is removed, the compost is sitting in a usual roll-off container ready for pick-up and delivery. No additional material handling is required other than delivery and emptying of the container 100. Once the container 100 has been delivered and emptied, the container 100 is available immediately for reuse in another composting cycle or can be returned to its original, non-composting use. Composting methods and cycling of multi-purpose containers, such as the container 100, is further described herein.

Figure 3:
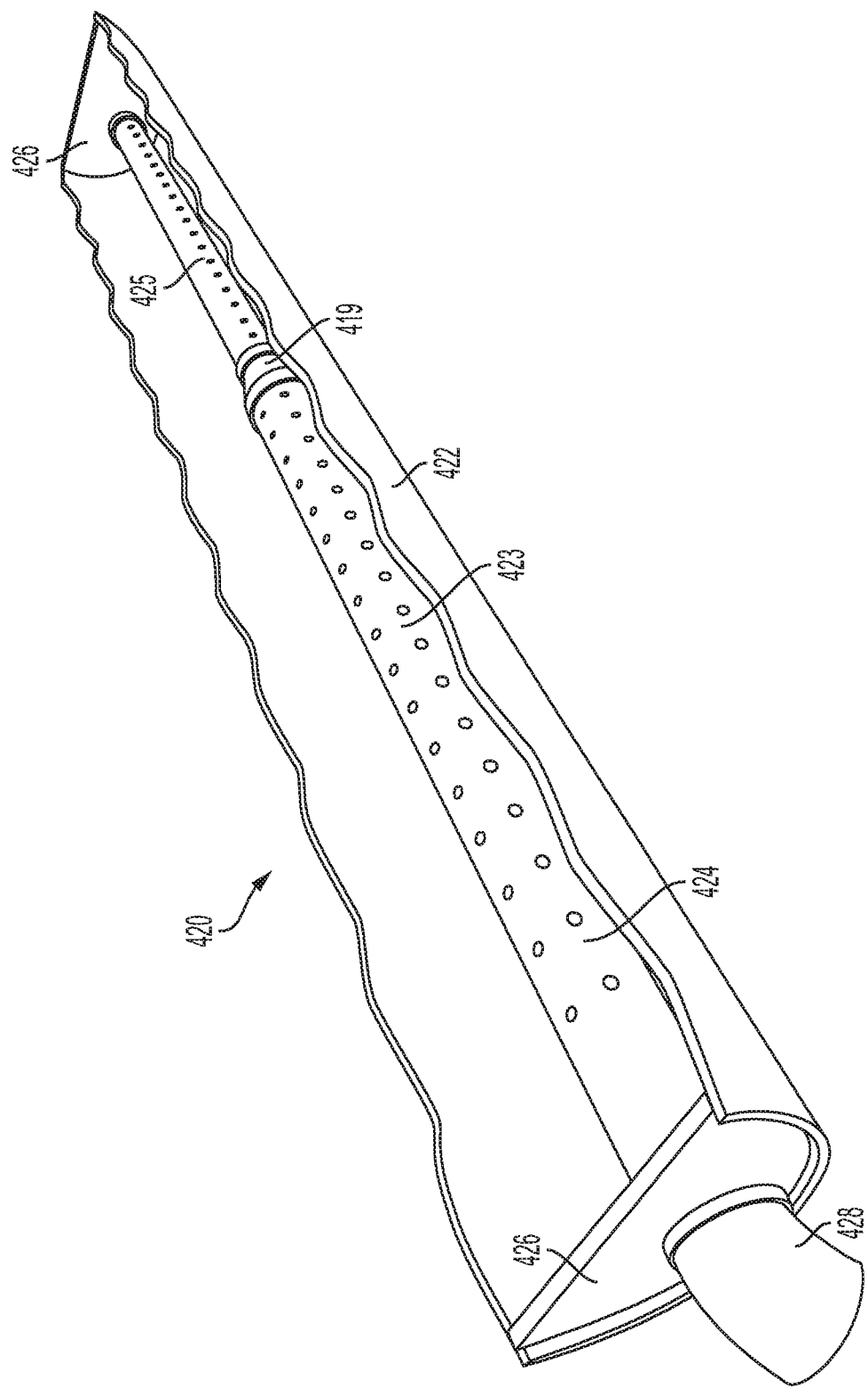
FIG. 3 is a perspective view of an aeration distributor for a composting system, according to various aspects of the present disclosure.
Figure 4:
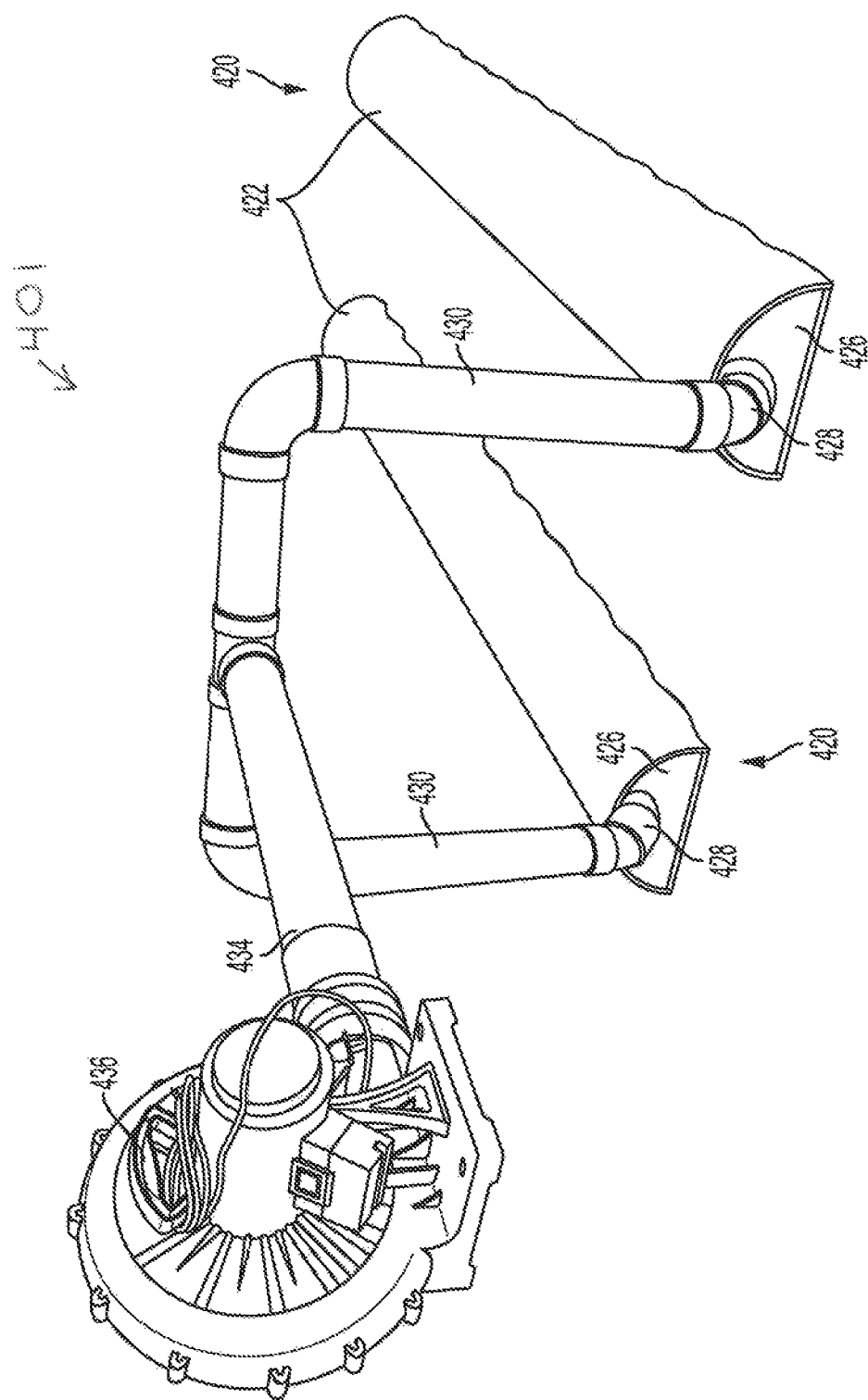
FIG. 4 is perspective view of a composting kit including the aeration distributor of FIG. 3, according to various aspects of the present disclosure.

Referring primarily now to FIGS. 3 and 4, various components of a composting system 401 are shown. In various instances, the components in FIGS. 3 and 4 can be utilized in the composting system 101 in FIG. 1 or the composting system 301 in FIG. 2. An aeration distributor 420 is depicted in an upside-down configuration in FIG. 3 to expose an inner tube 424 positioned within a barrier tube 422. As depicted in FIG. 3, the inner tube 424 includes a first portion 423 and a second portion 425 having different diameters. A flow regulator 419 is positioned between the first portion 423 and the second portion 425. The flow regulator 419 is a reducer fitting, which reduces the diameter of the inner tube 424 from a larger diameter in the first portion 423 to a smaller diameter in the second portion 425. The flow regulator 419 is configured to control the velocity of air moving through the inner tube 424. For example, the reduced diameter of the second portion 425 can maintain the velocity of the air moving through the inner tube 424 and, thus, seek to maintain an even distribution of air along the length of the inner tube 424 and the container 100 (FIGS. 1 and 2). The inner tube 424 also includes perforations or holes spaced along the length thereof. Referring to FIG. 3, the first portion 423 has a higher ratio of outlets, i.e. perforations, than the second portion 425. For example, the first portion 423 includes additional rows of perforations. In various instances, the varying quantity of perforations along the inner tube 424 is configured to control the airflow through the inner tube 424 and into the container. Additional flow regulators are further described herein.

The inner tube 424 is held within the barrier tube 422 by semi-circular buttresses 426 at both ends. Moreover, a first end of the inner tube 424 is coupled to an elbow fitting 428 and the opposite end of the inner tube 424 is capped. Referring primarily to FIG. 4, the composting system 401 includes a pair of aeration distributors 420 arranged in parallel. The aeration distributors 420 are coupled to upright pipes 430 that are configured to exit a container, such as the container 100 in FIG. 1, for example, along a top edge of one of the four sides. The upright pipes 430 are connected to the elbow fittings 428 and extend upward toward a manifold 432. The manifold 432 is connected to a blower 436 such that a fluid pathway is provided from the blower 436 to the inner tubes 424 (FIG. 3). The blower 436 can be similar to the blower 136 (FIGS. 1 and 2) in many respects.

Due to the length of stand-size containers, multiple conduits may be assembled together to form an aeration conduit. For example, most roll-off containers are a standard 22-foot length (see the containers 600, 700, and 800 in FIGS. 9, 10, and 11, respectively). In one instance, three seven-foot long conduits can be coupled together to span the length of the standard roll-off container. In another instance, six 40-inch long conduits can be coupled together for the standard roll-off container. Coupling conduit segments together to form the aeration conduit can allow an operator to use readily-available commercial components. For example, suitable pipes are available at many commercial home improvement stores; however, such pipes are generally less than 10-feet long. For example, four-inch and six-inch diameter pipes are readily available from commercial home improvement stores in lengths between one and ten feet long. The longer, commercially-available pipes (e.g. 20-foot long pipes) may only be available in 12-inch or 15-inch diameters. However, smaller diameters can encounter less resistance when being withdrawn from the container, especially when the container is loaded with compost. In such instances, it can be desirable to assemble multiple smaller diameter pipes to form the aeration conduit.

Because air is compressible, it can be compressed at the far end (the distal capped end) of the aeration conduit and, thus, a greater volume of air can exit the aeration conduit toward the far end in comparison to the near end (the proximal end). For example, air can simply flow past the more-proximal perforations and exit through the more-distal perforations where the air is more compressed adjacent to the distal end cap past which the air cannot flow. To improve air distribution along the aeration conduit, flow regulators can be positioned along the length thereof. For example, restricting orifices can be provided along the length of the aeration conduit. Restricting orifices have a smaller inner diameter than the inner diameter of the conduit portions. In instances in which multiple conduits have been combined to form the aeration conduit, the restricting orifices can be installed between adjacent conduit portions. For example, for a 4-inch diameter aeration conduit, a 3-inch, 2-inch, or 1-inch diameter restrictive orifice can be provided between the 4-inch diameter conduit portions. The reader will readily appreciate that alternative diameter aeration conduits and/or restrictive orifices can be utilized. The placement of restrictive orifices along the length of the aeration conduit can assist in making the air flow from the aeration conduit into the container more uniform along the length of the aeration conduit.

The multiple conduit segments can be coupled together with conduit couplers. For example a coupler fitting can be positioned between adjacent conduit segments. The joints along the length of the aeration conduit (e.g., the joint between a coupler fitting and a conduit segment) can generate potential failure points. For example, when a retraction force is applied to the aeration conduit to withdraw the aeration conduit from under a load of compost in the container, the aeration conduit can be prone to separation at one or more joints. In various instances, a retraction assembly can be used to hold the components of the aeration conduit together during the retraction step. The retraction assembly can include a cable that extends along at least a substantial portion of the aeration conduit. For example, the cable can extend from the distal end cap though each restrictive orifice, coupling, and perforated pipe segment to the proximal end of the of the aeration conduit. During retraction, the end of the cable, or a connector thereon, can be accessible and pulled upon to withdraw the entire aeration conduit. A first tensile or pulling force can compress the aeration assembly and ensure the components are tightly or snugly coupled together. A second, greater tensile or pulling force on the cable can pull the aeration conduit from the container. Because the aeration conduit can be comprised of PVC pipe and have a higher compressive strength (pounds force applied before failure) than tensile strength, the retraction assembly can improve the strength of the aeration conduit. Additionally, as the cable is pulled, it can become taut and straight and, as a result, the various components forming the aeration conduit can straighten along the axis thereof, which may experience less resistance as the aeration conduit is withdrawn along the axis.

An example aeration conduit 520 is shown in FIGS. 5 and 6. The aeration conduit 520 is positioned in a roll-off container 500 in FIG. 6. The container 500 can be similar to the containers 600, 700, and 800 (FIGS. 9-11), for example. Exemplary containers are also depicted in FIGS. 1, 2, and 7, for example. The aeration conduit 520 can be combined with other components of a composting kit to form a composting system 501. For example, the aeration conduit 520 can be fluidically coupled to the blower 136 (FIGS. 1 and 2) and positioned along the bottom surface of the container 500.

The aeration conduit 520 is formed from multiple conduit segments 524a, 524b, 524c, 524d, 524e, and 524f which are coupled together at coupler fittings 540. For example, a coupler fitting 540 can be positioned between a first segment 524a, or proximal-most segment, and a second conduit segment 524b. The joints between the conduit segments 524a, 524b, 524c, 524d, 524e, and 524f can each be configured to accommodate flow regulators, such as restrictive orifices 542. The restrictive orifices 542 can define an opening or aperture that is smaller than the diameter of the adjacent conduit segments. In such instances, the restrictive orifices 542 can control the flow of air through the aeration conduit 520. In various instances, one or more restrictive orifices 542 can be inserted or received in the respective coupler fitting 540.

The aeration conduit 520 includes six conduit segments. Each segment can be 40-inches long. In other instances, the segments can comprise different lengths. The reader will readily appreciate that the number and length(s) of the conduit segments can be adjusted to accommodate different container dimensions. Additionally, in FIGS. 5 and 6, a restrictive orifice is positioned between each adjacent conduit segment. In other instances, certain segment joints may not include a restrictive orifice. Additionally or alternatively, one or more alternative flow regulators (e.g. different patterns of perforations and/or diameter-changing fittings) can be incorporated into the aeration conduit 520.

A cable 546 extends through the aeration conduit 520 from a proximal end 519 to a distal end 521 of the aeration conduit 520. The cable 546 can be a quarter-inch diameter steel cable, for example. The cable 546 includes a fixed end 548, which is anchored to the aeration conduit 520, and a free end 550. The fixed end 548 of the cable 546 is secured to a bar 552 extending through the aeration conduit 520. The bar 552 can be a metal pipe, for example, that extends through the aeration conduit 520 between the elbow joint 528 and the proximal-most conduit segment 524a, for example. A loop of cable 546 at the fixed end 548 can be formed with a cable clamp, for example, and the bar 552 can be retained within the loop of cable 546. The free end 550 of the cable 546 forms a connector, e.g. another loop of cable 546 formed with a cable clamp, for example. Between the fixed end 548 and the free end 550, the cable 546 extends through each restrictive orifice 542, coupler fitting 540, perforated conduit segment 524, and a distal end cap 544 of the aeration conduit 520.

To aeration conduit 520 can be utilized in the various composting methods described herein. In one aspect, a composting method can include positioning one or more of the aeration conduits 520 along a bottom surface of the container 500, which can be an open-top roll-off container. For example, the aeration conduits 520 can be assembled and lowered into the container 500. In various instances, the multiple segments and couplings of the aeration conduit 520 can be pre-assembled. For example, the first three segments 524a, 524b, and 524c can be connected and glued at the respective connections. Similarly, the last three segments 524d, 524e, and 524f can be connected and glued at the respective connections. In such instances, sub-assemblies can be easily transported. For example, sub-assemblies spanning approximately 10 feet or less can be easily transported by pick-up truck. In other instances, sub-assemblies may not be pre-formed and/or glue between the various components of the aeration conduits 520 that may not be used. The various subassemblies can be modular components that can be assembled and disassembled to form different aeration conduits and/or aeration conduits of different lengths, for example.

A delivery conduit 530 can be fluidically coupled to each aeration distributor 520 at an elbow joint 528. For example, an elbow joint 528 can extend from the proximal end 519 of the aeration conduits 520. The elbow joint 528 includes two 45-degree fittings 528a, 528b and a sacrificial sleeve 529 therebetween. In various instances, the first 45-degree fitting 528a can be secured to the delivery conduit 530 with adhesive and the second 45 degree fitting 528b can be secured to the aeration conduit 520 with adhesive. The sacrificial sleeve 529 can secure the two 45-degree fittings 528a, 528b together without glue. For example, a clearance fitting in the elbow joint 528 can releasably secure the delivery conduit 530 to the aeration conduits 520. In such instances, the sacrificial sleeve 529 can facilitate separation of the delivery conduits 530 from the aeration conduits 520. The delivery conduit(s) 530 can be fluidically coupled a blower, such as the blower 136 (FIGS. 1 and 2). The weight of the aeration conduits 520 can hold the aeration conduits 520 in place in the container 500.

The composting method can also include loading raw material into the open-top roll-off container 500 to cover the aeration conduits 520 and a portion of the delivery conduits 530 installed therein. Thereafter, air can be provided from the blower, to the delivery conduits 530, and to the aeration conduits 520 during a composting cycle, which can encourage the composting of the raw material. The compost can subsequently be unloaded from the open-top roll-off container.

In various instances, before unloading the compost from the open-top roll-off container, the composting system 501 can be disassembled. For example, the kit components of the composting system 501 can be removed from the container 500. In various instances, the delivery conduit 530 can be withdrawn from the container 500 along an upright axis UA that is collinear with the delivery conduit 530 through the open-top of the roll-off container 500. For example, the delivery conduit 530 can be releasably coupled to the aeration conduit 520 and can be separated at the sacrificial sleeve 529, which may remain in the container 500 with the compost. Additionally, the aeration conduit 520 can be withdrawn along an aeration axis AA that is collinear with the aeration conduit 520 through the door of the open-top roll-off container 500. The aeration axis AA traverses the upright axis UA. In FIG. 6, the aeration axis AA is perpendicular, or substantially perpendicular (e.g. between 80 degrees and 100 degrees), to the upright axis UA. For example, the aeration axis AA can be oriented horizontally, or substantially horizontally, and the upright axis UA can be oriented vertically, or substantially vertically.

To withdraw the delivery conduit 530 and/or the aeration conduit 520, a retraction system can be utilized. For example, the free end 550 of the cable 546 can be secured to a tractor or other vehicle and pulled to compress the aeration conduit 520 and pull the aeration conduit 520 through an open door of the container 500. In various instances, the delivery conduit 530 can also include a retraction system including a cable 536 that can be anchored to the embedded end of the delivery conduit 530 with a metal bar, post, fastener, or spike, for example.

Referring now to FIG. 7, another composting system 901 is shown. The composting system 901 includes an open-top roll-off container 900. The container 900 can be similar to the containers 600, 700, and 800 (FIGS. 9-11), for example. Exemplary containers are also depicted in FIGS. 1, 2, and 6, for example. A composting kit is assembled and installed in the container 900. For example, the composting kit can include one or more aeration conduits, such as the conduits 520 (FIGS. 5 and 6), the aeration distributors 120 (FIG. 1), or the aeration distributors 420 (FIGS. 3 and 4), for example, and can further include one or more delivery conduits, such as the upright pipes 130 (FIG. 1), the upright pipes 430 (FIG. 4), and the delivery conduits 530 (FIGS. 5 and 6). A manifold 932 fluidically couples a blower 936 to the delivery conduits at releasable elbow joints.

The composting system 901 also includes a cover or roof 960. During a composting cycle, water droplets or condensation can form on the inside surface of the roof 960. The surface tension of the condensation and the slanted profile of the inside surface of the roof 960 can direct the condensation to "roll" toward the edges of the roof 960. The edges of the roof 960 are configured to overhang the perimeter of the container 900 such that the condensation is discharged beyond the perimeter of the container 900. In other words, the roof 960 can provide an escape path for air and water.

The roof 960 includes a frame 964, which rests on the top edge 923 of the container 900 without modifying the container 900. For example, the frame 964 can be constructed from three-quarter inch PVC water pipes and molded fittings at the roof ridge. A lower portion of the frame 964 can fit into wood blocks that have an embedded bar or spike (e.g. reinforcement bar) extending therefrom. Bungee cords 966 can further secure the frame 964 of the roof 960 to the container 900. Similar to the roof 160, a tarp can be positioned over the frame 964.

A blower 936 and a control box 990 are both supported on a bracket 992 that sits by gravity on the edge 923 of the container 900. The bracket 992 can be constructed from plywood, for example. The bracket 992 includes a T-shaped body—the blower 936 is secured to the horizontal member of the T-shaped body, and the control box 990 is secured to the vertical member of the T-shaped body. The bracket 992 can also include a hook from the horizontal member that engages an inside surface of the container 900. In certain instances, the blower 936 and the control box 990 could be on two separate brackets. The blower 936 can be similar to the blower 136 (FIGS. 1 and 2) in many respects, and the control box 990 can be similar to the control panel 190 (FIG. 2) in many respects.

The composting system 901 can be disassembled in about 15 minutes by a single person. For example, the roof 960 and the bracket 992 can be removed from the container 900. In removing the bracket 992, the blower 936 can be decoupled from the delivery conduit(s). Thereafter, the delivery conduit(s) can be withdrawn vertically through the open top of the container 900. The door of the container 900, which is positioned on the far/distal side from the blower 936, can be opened to expose the distal end of the aeration conduit(s). The aeration conduits can be withdrawn horizontally through the open door of the container 900. The result of this disassembly is the roll-off container 900 filled with compost but otherwise unmodified and ready for movement by a commercial waste hauler, for example.

In certain instances, it is desirable to minimize the negative value of raw, compostable material, such as manure, for example, while maximizing the positive value derivable from such material. Using unmodified standard containers, such as roll-off waste containers and/or open-topped shipping containers, for composting such material can provide a cost-efficient option that is scalable for entities of different sizes. For example, an open-top roll-off container is a relatively low-cost composting vessel that is commercially-available in many communities. Additionally, open-top roll-off container provide flexibility with respect to size, placement and investment (i.e. purchasing and leasing can be available). Open-top roll-off containers further utilize industry standard roll-off container vehicles for facilitating handling, transportation and/or delivery of raw material and/or compost.

In the composting systems disclosed herein, the containers can amount to the largest portion of the investment. For example, roll-off containers can be approximately $2,000 to $4,000 depending on the local market when purchased new. Moreover, used containers may be utilized in certain instances, which can reduce the costs. Even unattractive and/or worn-in containers, which may no longer be used for conventional purposes (e.g. refuse collection, storage, and/or shipping) because of usual wear and tear, rust, and/or general aesthetic deficiencies may be suitable for composting applications if they are in reasonable condition. The other components of the composting system (e.g., the blower, on-off control, ductwork, and aeration distributor) can be obtained for approximately $1,000 to $2,000 per composting system, depending upon the size of the required composting system. If the roll-off containers are unmodified, these containers can be leased or rented from waste management companies, which can dramatically reduce the capital cost of the composting system. For example, if the containers are rented, the capital cost to begin composting is replaced with periodic rental payments (e.g., a variable operating cost).

Utilizing unmodified containers also introduces other benefits, including:

In certain instances, the material can be left stored in the container after composting for curing and then delivery, thereby avoiding the additional material handling steps of unloading from the container and refilling into delivery trucks.

In various instances, the material can be delivered with both the contents and the container and the container can be used or resold by the buyer of the compost at his/her election.

In certain instances, the empty return of the container after a sale of compost to a remote buyer can be avoided if the container is sold back into the local waste industry near the buyer of the compost.

In various instances, the delivery of empty and full containers can be competitively "bid" to waste haulers in the area because trucks are uniformly built to accept the usual roll-off containers. This can further lower operating costs.

Farm operators who produce raw manure and other organic waste and who have a manure disposal problem could compost the waste using this system and method. For example, a farmer can buy or lease a container and utilize a composting system as described herein. The compost can be used by the farmer and/or sold to neighbors and/or the public. In such instances, the farmer would have a waste problem solved and a new revenue source. Moreover, the unmodified container can be maintained as an asset that can be sold and returned to the pre-composting use. In other instances, the farmer can obtain the composting system disclosed herein from an entity, which can lease the system and provide technical assistance and/or transportation services. In certain instances, a nursery, landscaper, and/or garden center operator can provide the composting system at little to no cost and use the resulting compost for its own operations. In such instances, the farmer can avoid the cost of waste disposal and the operator can avoid the cost of compost purchases. In certain instances, a waste disposal operator can provide the composting system to individuals and/or farmers. This could be particularly helpful during periods when the waste disposal contractor has excess/idle roll off containers as these idle containers would be producing an alternative income with compost sales and the farmer avoids the waste disposal costs.

In the various examples above, the unmodified containers accommodate the expansion and contracting of the composting operation, which may be due to seasonality and/or the changing census of animals on a farm, for example. In other words, the census of composting containers can be ramped up and down with containers flowing to and from the waste management industry (or other non-composting business), for example, as business and/or composting needs vary over time. In particular, out-of-use containers can be returned to their pre-composting uses.

In various instances, the composting systems disclosed herein provide flexibility regarding relocation of the composting operation. For example, the composting system can remain at a location adjacent to the raw material and/or the raw material can be loaded into the containers and moved to a different property for composting (such as to the above-mentioned nursery, landscaper or garden center operation). Moreover, the finished compost can be simply stored within the containers and/or moved and unloaded with ease as these containers are designed for convenient handling.

Figure 8:
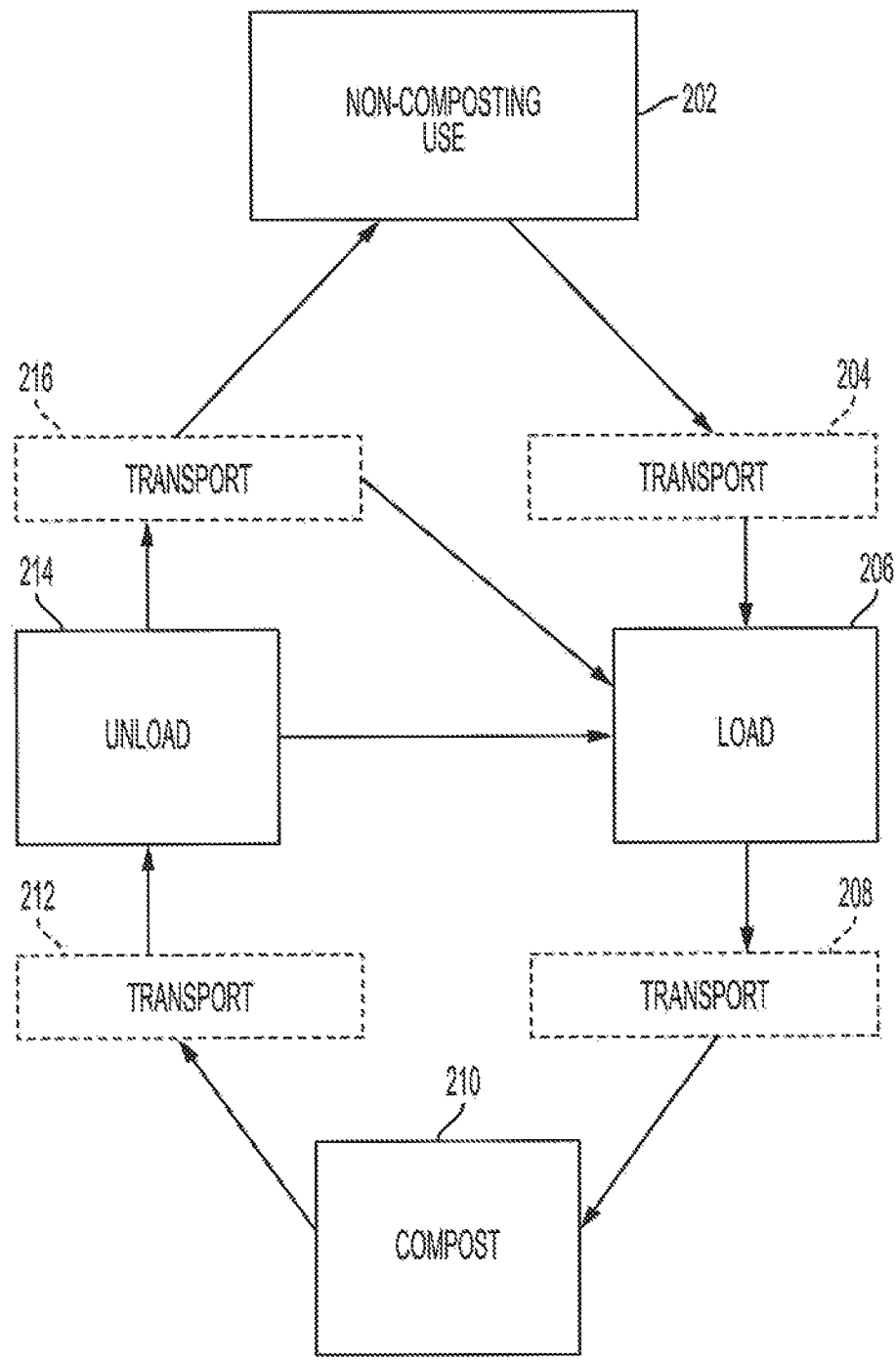
FIG. 8 is a flowchart depicting composting cycles for a composting system, according to various aspects of the present disclosure.

Referring primarily to FIG. 8, a flowchart depicting exemplary composting sequences is depicted. Initially, the container for a composting system, such as the composting system 101 (FIG. 1), the composting system 301 (FIG. 2), the composting system 401 (FIG. 4), the composting system 501 (FIG. 6), and the composting system 901 (FIG. 7), for example, can be engaged in a non-composting use at block 202. The container can then be repurposed for composting. For example, the container can be loaded with the additional components of the composting system and with raw material at block 206. Optionally, the container can be relocated at block 204. For example, the container alone or the container in combination with the additional components for the composting system can be leased from a lessor and delivered to the lessee. After the container is loaded at block 206, the composting cycle can be completed at block 210. Optionally, the container can be relocated at block 208 between loading and composting. For example, the container can be transported to a different location on the lessee's property, the lessor's property and/or a third party's property. Upon completion of the composting cycle, the container can be unloaded at block 214. In certain instances, the compost can be unloaded. Additionally or alternatively, the components of the composting system (e.g. the aeration distributors) can be unloaded. If the container is being returned to a non-composting use at step 202, the additional components should be removed therefrom. Alternatively, if the container is ready for receipt of additional raw material, the additional components may remain in the container and it can again be loaded with raw material at step 206. Optionally, the container can be relocated at block 212 between composting and unloading. For example, the composted material can be sold to a third party and/or returned to the lessor within the container at block 212. After the container is unloaded, it can be transported at block 216 to a new site (e.g. a new lessee) at block 206 and/or to a non-composting use at block 202.

The reader will appreciate that the flowchart described above with respect to FIG. 8 can apply to multiple containers and different sized containers. The container is filled with raw material at block 206 and transformed compost is unloaded at step 214. A lessor of the container and/or composting system can then distribute the composted material and relocate the container to minimize expenses and maximize profits. For example, the composted material can easily be transported to regions having a high demand for compost before it is relocated or delivered to another lessee. In various instances, composting at step 210 can occur during a portion of a transportation route to maximize use of the container during the composting cycle. In such instances, the container can serve dual purposes as a composting vessel and shipping or transportation container.

Example Aeration Distributor:

The pair of distributors 420 for a 22-foot-long roll-off waste container is made of the following commercially-available materials:

- one 20-foot length, 12-inch diameter rigid plastic drain (as shown in a short section below) that is cut lengthwise in a particular manner into two equal half tubes;
- two 10-foot length, 4-inch diameter perforated drain pipe;
- two 10-foot length, 3-inch diameter perforated drain pipe;
- two 3-inch diameter perforated drain pipe caps;
- two 3-inch to 4-inch diameter drain line connectors;
- four or more 4-inch diameter 90-degree pipe fitting;
- one or more 10-foot length, 4-inch diameter non-perforated drain pipe (cut into particular lengths); and
- Various pipe fittings and elbows, as necessary.

In this example, cutting of the pipes is minimized to the lengthwise cutting of the 20-foot, 12-inch diameter pipe and cross-cut cutting of the 4-inch diameter pipes. The 12-inch rigid plastic drain line is cut lengthwise along two opposite sides by a SAWZALL® All Type Tool. Each of these two cuts, so to produce two halves, are not a straight cut but rather are cut with a shallow sine-wave (see FIGS. 3 and 4) whose amplitude is approximately 1-inch and whose period is a few inches. After the two 20-foot, long halves are produced, the perforated 3-inch diameter and 4-inch diameter pipes are joined together, capped on the open 3-inch diameter end and fitted with the 90-degree elbow on the opposite 4-inch open end. These 3-inch and 4-inch diameter perforated tubes are attached to the half tubes an equal distance from each cut so to create an air distribution tube hanging in a half circle tunnel. The tube-in-tunnel (as viewed from the end) air distributor is then complete.

The "sine-wave" cut mentioned above produces periodic gaps between the nearly flat, or nearly flat, solid floor of the container and the cut edges. These periodic gaps permit air to pass from the aeration distributor into the raw material to be composted. In other instances, a toothed, jagged, contoured, or otherwise undulating profile can provide suitable gaps between the floor of the container and the distributor. A filter media of coarse wood chips, or similar material, placed outside this interface of the cut edge of the 12" pipe and the floor of the container can also aid in air distribution.

Various aspects of the subject matter described herein are set out in the following numbered examples.

Example 1—A composting kit comprising a perforated aeration conduit defining a first axis, wherein the perforated aeration conduit comprises a first end, a second end, and a central opening along the first axis between the first end and the second end; a delivery conduit defining a second axis, wherein the delivery conduit is configured to be fluidically coupled to the first end of the perforated aeration conduit at a releasable joint comprising a clearance fit; and a blower configured to be fluidically coupled to the delivery conduit; wherein the composting kit is configured to be assembled into a working configuration in which the perforated aeration conduit is positioned within a container and the delivery conduit is fluidically coupled to the blower and to the perforated aeration conduit, wherein the second axis traverses the first axis when the composting kit is in the working configuration, and wherein the blower is configured to provide air to the perforated aeration conduit when the composting kit is in the working configuration.

Example 2—The composting kit of Example 1, wherein the delivery conduit comprises an upright conduit, and wherein the upright conduit comprises a non-perforated pipe.

Example 3—The composting kit of Example 1 or 2, further comprising a flow regulator positioned along the perforated aeration conduit between the first end and the second end, wherein the flow regulator comprises a reducer fitting.

Example 4—The composting kit of Example 1 or 2, further comprising a flow regulator positioned along the perforated aeration conduit between the first end and the second end, wherein the flow regulator comprises a restrictive orifice positioned within the central opening of the perforated aeration conduit.

Example 5—The composting kit of Example 1, 2, 3, or 4, further comprising the container, wherein the container comprises a roll-off container, wherein the roll-off container comprises an open top and a side wall comprising a door, and wherein the second end of the perforated aeration conduit is positioned adjacent to the door.

Example 6—The composting kit of Example 5, wherein the composting kit is configured to be disassembled by withdrawing the delivery conduit through the open top along the second axis and withdrawing the perforated aeration conduit through the door along the first axis.

Example 7—The composting kit of Example 6, further comprising an end cap positioned at the second end of the perforated aeration conduit and a cable extending through the central opening of the perforated aeration conduit and through an opening in the end cap; wherein an end of the cable is accessible through the door, wherein application of a first pulling force on the end of the cable is configured to compress the perforated aeration conduit, and wherein application of a second pulling force on the end of the cable is configured to withdrawal the perforated aeration conduit through the door.

Example 8—The composting kit of Example 5, 6, or 7, further comprising a control panel communicatively coupled to the blower, wherein at least one of the control panel and the blower are configured to hang outside the container.

Example 9—The composting kit of Example 8, wherein the roll-off container comprises a top edge extending around the open top, and wherein the composting kit further comprises a bracket configured to hang over the top edge and support at least one of the control panel and the blower.

Example 10—The composting kit of Example 1, 2, 3, 4, 5, 6, 7, 8, or 9, wherein the perforated aeration conduit comprises an outer surface and a plurality of perforations defined from the outer surface to the central opening, wherein the plurality of perforations comprises a proximal-most perforation and a distal-most perforation, and wherein the perforations are distributed unequally between the proximal-most perforation and the distal-most perforation.

Example 11—The composting kit of Example 10, wherein spacing between adjacent perforations gradually decreases along the perforated aeration conduit from the first end to the second end.

Example 12—The composting kit of Example 1, 2, 3, 4, 5, 6, 7, 8, 9, 10, or 11, further comprising a second perforated aeration conduit extending parallel to the perforated aeration conduit, wherein the perforated aeration conduits comprise a plurality of restrictive orifices positioned therein; a second delivery conduit fluidically coupled to the second perforated aeration conduit at a second releasable joint; and a manifold configured to bifurcate air flow between the delivery conduit and the second delivery conduit.

Example 13—The composting kit of Example 1, 2, 3, 4, 5, 6, 7, 8, 9, 10, 11, or 12, further comprising a tube-in-tunnel aeration distributor, comprising the perforated aeration conduit; a barrier positioned at least partially around the perforated aeration conduit; and a frame configured to secure the barrier relative to the perforated aeration conduit.

Example 14—The composting kit of Example 13, further comprising a second tube-in-tunnel aeration distributor, comprising a second perforated aeration conduit; a second barrier positioned around the second perforated aeration conduit; and a second frame configured to secure the second barrier relative to the second perforated aeration conduit; wherein the second tube-in-tunnel aeration distributor is configured to extend parallel to the tube-in-tunnel aeration distributor.

Example 15—The composting kit of Example 14, further comprising a manifold comprising a tee, wherein the tee comprises an inlet configured to be fluidically coupled to the delivery conduit; a first outlet fluidically coupled to the perforated aeration conduit; and a second outlet fluidically coupled to the second perforated aeration conduit.

Example 16—A composting system, comprising: an open-top roll-off container comprising a doorway; a perforated aeration conduit positioned within the open-top roll-off container, wherein the perforated aeration conduit defines a first axis extending through the doorway, and wherein the perforated aeration conduit comprises a first end, a second end, and a central opening along the first axis between the first end and the second end; a delivery conduit defining a second axis traversing the first axis, wherein the delivery conduit is fluidically coupled to the first end of the perforated aeration conduit at a releasable elbow joint; and a blower positioned outside the open-top roll-off container and fluidically coupled to the delivery conduit, wherein the blower is configured to provide pressurized air to the perforated aeration conduit.

Example 17—The composting system of Example 16, further comprising a second perforated aeration conduit positioned within the open-top roll-off container, wherein the second perforated aeration conduit defines a third axis extending through the doorway and oriented parallel to the first axis; and a second delivery conduit fluidically coupled to the second perforated aeration conduit and to the blower.

Example 18—The composting system of Example 16 or 17, further comprising a control panel communicatively coupled to the blower, wherein the open-top roll-off container comprises a top edge, and wherein the composting system further comprises a bracket configured to hang over the top edge and support at least one of the control panel and the blower outside the open-top roll-off container.

Example 19—A composting method, comprising positioning an aeration distributor within an open-top roll-off container; fluidically coupling a delivery conduit to the aeration distributor; fluidically coupling a blower to the delivery conduit; loading raw material into the open-top roll-off container; providing air to the aeration distributor from the blower during a composting cycle in which the raw material becomes compost; and unloading the compost from the open-top roll-off container.

Example 20—The composting method of Example 19, further comprising withdrawing the delivery conduit along an upright axis through an open-top of the open-top roll-off container before unloading the compost from the open-top roll-off container, wherein the delivery conduit is releasably coupled to the aeration distributor; and withdrawing the aeration distributor along an aeration axis through a door of the open-top roll-off container before unloading the compost from the open-top roll-off container, wherein the aeration axis traverses the upright axis.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

As used throughout this description, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some aspects they might not. The communication module may implement any of a number of wireless or wired communication standards or protocols, including but not limited to W-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing module may include a plurality of communication modules. For instance, a first communication module may be dedicated to shorter range wireless communications such as Wi-Fi and Bluetooth and a second communication module may be dedicated to longer range wireless communications such as GPS, EDGE, GPRS, CDMA, WiMAX, LTE, Ev-DO, and others.

As used herein a processor or processing unit is an electronic circuit which performs operations on some external data source, usually memory or some other data stream. The term is used herein to refer to the central processor (central processing unit) in a system or computer systems (especially systems on a chip (SoCs)) that combine a number of specialized "processors."

As used herein, a system on a chip or system on chip (SoC or SOC) is an integrated circuit (also known as an "IC" or "chip") that integrates all components of a computer or other electronic systems. It may contain digital, analog, mixed-signal, and often radio-frequency functions—all on a single substrate. A SoC integrates a microcontroller (or microprocessor) with advanced peripherals like graphics processing unit (GPU), Wi-Fi module, or coprocessor. A SoC may or may not contain built-in memory.

As used herein, a microcontroller or controller is a system that integrates a microprocessor with peripheral circuits and memory. A microcontroller (or MCU for microcontroller unit) may be implemented as a small computer on a single integrated circuit. It may be similar to a SoC; an SoC may include a microcontroller as one of its components. A microcontroller may contain one or more core processing units (CPUs) along with memory and programmable input/output peripherals. Program memory in the form of Ferroelectric RAM, NOR flash or OTP ROM is also often included on chip, as well as a small amount of RAM. Microcontrollers may be employed for embedded applications, in contrast to the microprocessors used in personal computers or other general purpose applications consisting of various discrete chips.

As used herein, the term controller or microcontroller may be a stand-alone IC or chip device that interfaces with a peripheral device. This may be a link between two parts of a computer or a controller on an external device that manages the operation of (and connection with) that device.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects. For example, features, structures or characteristics of the composting systems 101, 301, 401, 501, 901 can be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A composting kit, comprising:
   a roll-off container;
   a perforated aeration conduit defining a first axis, wherein the perforated aeration conduit comprises a first end, a second end, and a central cylindrical conduit along the first axis between the first end and the second end;
   a delivery conduit defining a second axis, wherein the delivery conduit is configured to be fluidically coupled to the first end of the perforated aeration conduit at a releasable joint; and
   a blower configured to be fluidically coupled to the delivery conduit;
   wherein the composting kit is configured to be assembled into a working configuration in which the perforated aeration conduit extends along a lower support surface within the roll-off container, wherein the second axis traverses the first axis when the composting kit is in the working configuration, and wherein the blower is configured to provide air to the perforated aeration conduit when the composting kit is in the working configuration.

2. The composting kit of claim 1, wherein the delivery conduit comprises an upright conduit, and wherein the upright conduit comprises a non-perforated pipe.

3. The composting kit of claim 1, further comprising a flow regulator positioned along the perforated aeration conduit between the first end and the second end, wherein the flow regulator comprises a reducer fitting.

4. The composting kit of claim 1, further comprising a flow regulator positioned along the perforated aeration conduit between the first end and the second end, wherein the flow regulator comprises a restrictive orifice positioned within the central cylindrical conduit of the perforated aeration conduit.

5. The composting kit of claim 1, wherein the roll-off container comprises an open top and a side wall comprising a door, and wherein the second end of the perforated aeration conduit is positioned adjacent to the door.

6. The composting kit of claim 5, wherein the composting kit is configured to be disassembled by withdrawing the delivery conduit through the open top along the second axis and withdrawing the perforated aeration conduit through the door along the first axis.

7. The composting kit of claim 6, further comprising:
   an end cap positioned at the second end of the perforated aeration conduit; and
   a cable extending through the central cylindrical conduit of the perforated aeration conduit and through an opening in the end cap;
   wherein an end of the cable is accessible through the door, wherein application of a first pulling force on the end of the cable is configured to compress the perforated aeration conduit, and wherein application of a second pulling force on the end of the cable is configured to withdrawal the perforated aeration conduit through the door.

8. The composting kit of claim 5, further comprising a control panel communicatively coupled to the blower, wherein at least one of the control panel and the blower are configured to hang outside the roll-off container.

9. The composting kit of claim 8, wherein the roll-off container comprises a top edge extending around the open top, and wherein the composting kit further comprises a bracket configured to hang over the top edge and support at least one of the control panel and the blower.

10. The composting kit of claim 1, wherein the perforated aeration conduit comprises an outer surface and a plurality of perforations defined from the outer surface to the central cylindrical conduit, wherein the plurality of perforations comprises a proximal-most perforation and a distal-most perforation, and wherein the perforations are distributed unequally between the proximal-most perforation and the distal-most perforation.

11. The composting kit of claim 10, wherein spacing between adjacent perforations gradually decreases along the perforated aeration conduit from the first end to the second end.

12. The composting kit of claim 1, further comprising:
   a second perforated aeration conduit extending parallel to the perforated aeration conduit, wherein the perforated aeration conduits comprise a plurality of restrictive orifices positioned therein;
   a second delivery conduit fluidically coupled to the second perforated aeration conduit at a second releasable joint; and
   a manifold configured to bifurcate air flow between the delivery conduit and the second delivery conduit.

13. The composting kit of claim 1, further comprising a tube-in-tunnel aeration distributor, comprising:
   the perforated aeration conduit;
   a barrier positioned at least partially around the perforated aeration conduit; and
   a frame configured to secure the barrier relative to the perforated aeration conduit.

14. The composting kit of claim 13, further comprising a second tube-in-tunnel aeration distributor, comprising:
   a second perforated aeration conduit;
   a second barrier positioned around the second perforated aeration conduit; and
   a second frame configured to secure the second barrier relative to the second perforated aeration conduit;
   wherein the second tube-in-tunnel aeration distributor is configured to extend parallel to the tube-in-tunnel aeration distributor.

15. The composting kit of claim 14, further comprising a manifold comprising a tee, wherein the tee comprises:
   an inlet configured to be fluidically coupled to the delivery conduit;
   a first outlet fluidically coupled to the perforated aeration conduit; and
   a second outlet fluidically coupled to the second perforated aeration conduit.

16. A composting system, comprising:
an open-top roll-off container comprising a doorway;
a perforated aeration conduit positioned within the open-top roll-off container, wherein the perforated aeration conduit comprises a cylindrical opening and defines a first axis extending through the doorway, and
wherein the perforated aeration conduit comprises a first end, a second end, and a central opening along the first axis between the first end and the second end;
a delivery conduit defining a second axis traversing the first axis, wherein the delivery conduit is fluidically coupled to the first end of the perforated aeration conduit at a releasable elbow joint; and
a blower positioned outside the open-top roll-off container and fluidically coupled to the delivery conduit, wherein the blower is configured to provide pressurized air to the perforated aeration conduit.

17. The composting system of claim 16, further comprising:
a second perforated aeration conduit positioned within the open-top roll-off container, wherein the second perforated aeration conduit defines a third axis extending through the doorway and oriented parallel to the first axis; and
a second delivery conduit fluidically coupled to the second perforated aeration conduit and to the blower.

18. The composting system of claim 16, further comprising a control panel communicatively coupled to the blower, wherein the open-top roll-off container comprises a top edge, and wherein the composting system further comprises a bracket configured to hang over the top edge and support at least one of the control panel and the blower outside the open-top roll-off container.

19. A composting method, comprising:
positioning a tubular aeration distributor within an open-top roll-off container such that the tubular aeration distributor extends along a lower support surface of the open-top roll-off container;
fluidically coupling a delivery conduit to the tubular aeration distributor;
fluidically coupling a blower to the delivery conduit;
loading raw material into the open-top roll-off container;
providing air to the tubular aeration distributor from the blower during a composting cycle in which the raw material becomes compost; and
unloading the compost from the open-top roll-off container.

20. The composting method of claim 19, further comprising:
withdrawing the delivery conduit along an upright axis through an open-top of the open-top roll-off container before unloading the compost from the open-top roll-off container, wherein the delivery conduit is releasably coupled to the tubular aeration distributor; and
withdrawing the tubular aeration distributor along an aeration axis through a door of the open-top roll-off container before unloading the compost from the open-top roll-off container, wherein the aeration axis traverses the upright axis.

* * * * *